(12) United States Patent
Wilt et al.

(10) Patent No.: US 8,188,749 B2
(45) Date of Patent: *May 29, 2012

(54) REMOVING EFFECTS OF NEAR SURFACE GEOLOGY FROM SURFACE-TO-BOREHOLE ELECTROMAGNETIC DATA

(75) Inventors: Michael Wilt, Abu Dhabi (AE); Garrett Kramer, El Sobrante, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/940,522

(22) Filed: Nov. 5, 2010

(65) Prior Publication Data

US 2011/0050232 A1    Mar. 3, 2011

Related U.S. Application Data

(62) Division of application No. 11/836,978, filed on Aug. 10, 2007, now Pat. No. 7,852,087.

(51) Int. Cl.
*G01V 3/18* (2006.01)
(52) U.S. Cl. ........................................ 324/338; 324/344
(58) Field of Classification Search .................. 324/332, 324/334, 337, 338, 339, 344
See application file for complete search history.

(56) References Cited

U.S. PATENT DOCUMENTS

| 4,323,848 | A |   | 4/1982  | Kuckes |
| 4,875,015 | A | * | 10/1989 | Ward ............................ 324/323 |
| 5,892,362 | A | * | 4/1999  | Warren et al. ................. 324/339 |
| 7,333,893 | B2 |   | 2/2008  | Burtz et al. |
| RE40,321  | E | * | 5/2008  | Srnka ............................ 324/354 |
| 7,852,087 | B2 | * | 12/2010 | Wilt et al. ..................... 324/338 |
| 2006/0091889 | A1 | * | 5/2006 | Ellingsrud et al. ............ 324/334 |
| 2009/0005992 | A1 | * | 1/2009 | Alumbaugh et al. ............. 702/7 |

OTHER PUBLICATIONS

Alumbaugh, D.L., et al., Theoretical and practical considerations for crosswell electromagnetic tomography assuming a cylindrical geometry, Geophysics, May-Jun. 1995, pp. 846-870, vol. 60, No. 3.

Dyck, A.V., Drill-Hole Electromagnetic Methods, Electromagnetic Methods in Applied Geophysics Applications-Part B, Nabighian, M.N. editor, 1991, pp. 881-930, vol. 2, Chapter 11, Society of Exploration Geophysicists.

Kaufman, A.A., et al., Frequency and Transient Soundings, 1983, pp. 162-212 and 257-313, Elsevier, The Netherlands.

(Continued)

*Primary Examiner* — Reena Aurora
(74) *Attorney, Agent, or Firm* — Bridget M. Laffey; Rachel E. Greene; Jakub M. Michna

(57) ABSTRACT

A method that involves developing an electromagnetic property model of a near surface area and using this electromagnetic property model and electromagnetic data acquired using one or more electromagnetic transmitters located above the near surface area and one or more electromagnetic receivers located within a wellbore to determine one or more electromagnetic properties of a subsurface area. Also an electromagnetic data acquisition system that includes one or more electromagnetic transmitters capable of being operated on the earth's surface, one or more first electromagnetic receivers capable of being operated within a wellbore and capable of receiving signals from the one or more electromagnetic transmitters, and one or more second electromagnetic receivers capable of being located on the earth's surface near the one or more electromagnetic transmitters and capable of receiving signals from the one or more electromagnetic transmitters. Related embodiments are also described.

15 Claims, 4 Drawing Sheets

OTHER PUBLICATIONS

Nyquist, J.E., et al., Comparison of an optimized resistivity array with dipole-dipole soundings in karst terrain, Geophysics, Jul.-Aug. 2007, pp. F139-F144, vol. 72, No. 4.

Routh, P.S., et al., Inversion of controlled source audio-frequency magnetotellurics data for a horizontally layered earth, Geophysics, Nov.-Dec. 1999, pp. 1689-1697, vol. 64, No. 6.

Spies, B.R., et al., Sensitivity Analysis of Cross-Well Electromagnetics, 62nd Annual International Meeting of Society of Exploration Geophysicists, Expanded Abstracts, 1992, pp. 502-505, EM4.6.

Spies, B.R., et al., Sensitivity analysis of crosswell electromagnetics, Geophysics, May-Jun. 1995, pp. 834-845, vol. 60, No. 3.

* cited by examiner

REMOVING EFFECTS OF NEAR SURFACE GEOLOGY FROM SURFACE-TO-BOREHOLE ELECTROMAGNETIC DATA

CROSS REFERENCE TO RELATED APPLICATIONS

This patent application is a divisional application and claims priority from U.S. patent application Ser. No. 11/836,978 filed Aug. 10, 2007, incorporated by reference herein in its entirety.

FIELD OF THE INVENTION

This invention is generally related to geophysical data acquisition and processing, and more particularly to methods of acquiring, processing, and/or using surface-to-borehole electromagnetic data and associated surface-to-borehole electromagnetic data acquisition systems.

BACKGROUND

Surface based electromagnetic (EM) data acquisition is well described in the geophysical literature in published papers and books. The types of EM data acquisition configurations considered below are described in texts such as Kaufman, A. A., and Keller, G. V., 1983, "Frequency and Transient Electromagnetic Sounding", published by Elsevier and Hohman, G. R., 1991, "Electromagnetic Methods in Applied Geophysics", published by the Society of Exploration Geophysicists.

Surface-to-borehole EM data acquisition is described in Dyck, A., 1991, "Drill-Hole Electromagnetic Methods", pp. 881-931, in Electromagnetic Methods in Applied Geophysics edited by G. R. Hohman, but he limits his discussion in this text to exploration for metallic ores using simple models and does not apply the technology for subsurface formation imaging.

As discussed in more detail below, sensitivity studies of typical surface to borehole electromagnetics configurations show high sensitivity near both the source and receiver positions. Whereas a high sensitivity is desired near the borehole-deployed receiver array to map the formation resistivity, it is not useful near the surface-deployed transmitter. In addition, the geology near the earth's surface tends to be complex and discontinuous.

Our challenge is to focus the measurement on the target of interest, the near well formation, while satisfying the sensitivity functions near the transmitter. This problem is analogous to the statics issue faced in surface seismics, where the local conditions can statically shift the formation response from the expected state.

SUMMARY OF INVENTION

One embodiment of the invention involves a method that includes developing an electromagnetic property model of a near surface area and using this electromagnetic property model and electromagnetic data acquired using one or more electromagnetic transmitters located above the near surface area and one or more electromagnetic receivers located within a wellbore to determine one or more electromagnetic properties of a subsurface area. Another embodiment of the invention involves an electromagnetic data acquisition system that includes one or more electromagnetic transmitters capable of being operated on the earth's surface, one or more first electromagnetic receivers capable of being operated within a wellbore and capable of receiving signals from the one or more electromagnetic transmitters, and one or more second electromagnetic receivers capable of being located on the earth's surface near the one or more electromagnetic transmitters and capable of receiving signals from the one or more electromagnetic transmitters. Other related embodiments of the invention are also described and claimed.

DETAILED DESCRIPTION

Overview

Figure 1:
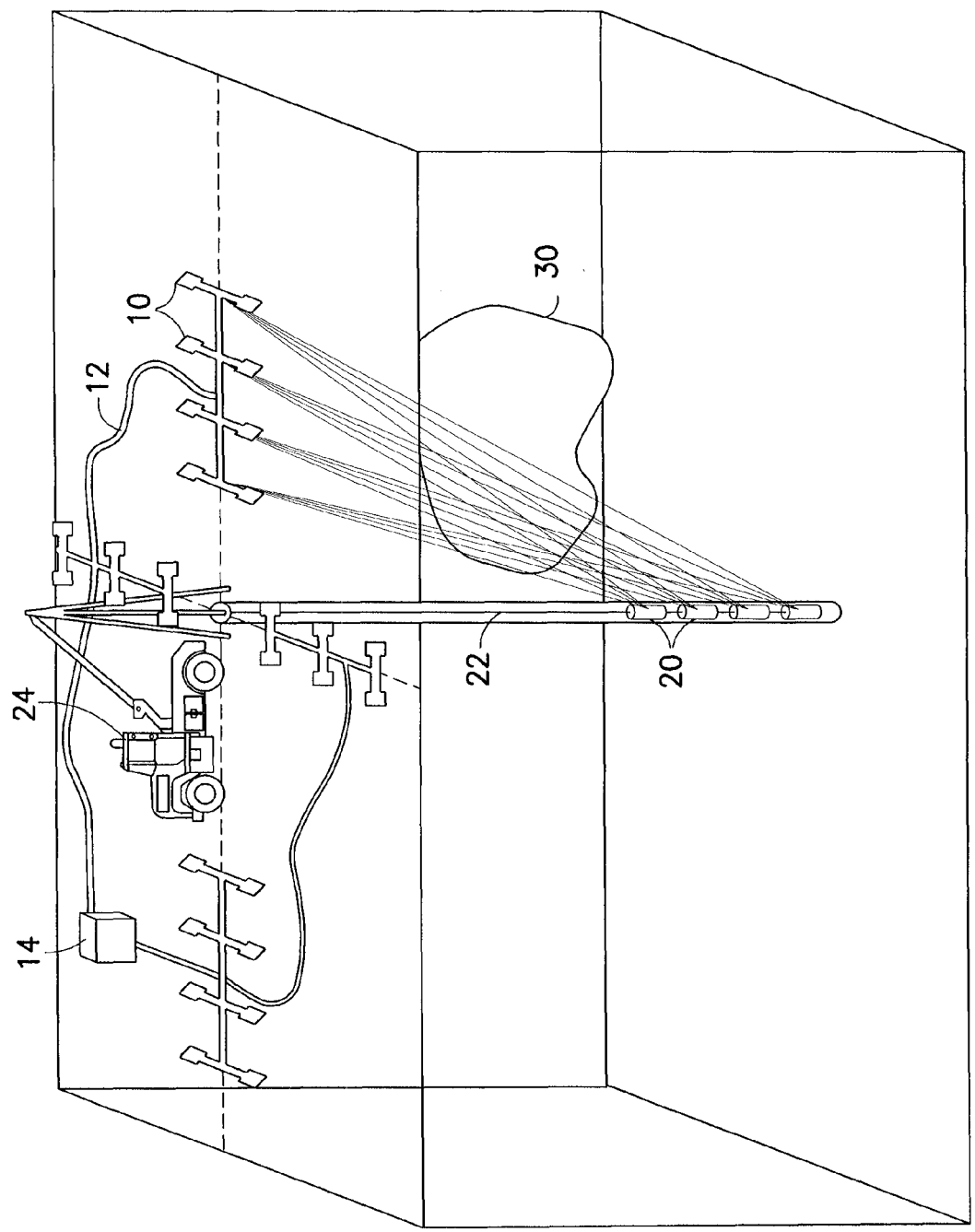
FIG. 1 illustrates a typical field configuration of Surface-to-Borehole EM data acquisition equipment.

This invention pertains to the acquisition and processing of surface to borehole (STB) electromagnetic data, typically acquired with a series of sources (also referred to as transmitters) deployed on the surface of the earth in concert with an array of borehole receivers (sometimes referred to herein as the "first" receivers) to image the subsurface away from the receiver locations within the well, often to offsets of 20-1500 meters away from the borehole, and also pertains to equipment that may be used to acquire such data.

This invention allows the separation of the electromagnetic effects (typically resistivity, but other electromagnetic properties such as conductance or permittivity may be determined as well) of the near surface geology from the deep resistivity distribution or related electromagnetic properties of the subsurface area that are sought. In one embodiment of the inventive method, we propose that this separation occurs in a three step process that may proceed in parallel with normal surface-to-borehole survey operations.

First, an array of surface receivers (sometimes referred to herein as the "second" receivers) is deployed near and adjacent to the surface transmitter antennas. These receivers are typically of the same type as the borehole ones and receive signals at the same frequency.

Second, the surface data are processed in a separate data stream to the STB data. They are used to decipher the near surface resistivity distribution near the transmitter antennas typically to depths and offsets of several hundred meters. To do this, we typically apply the same 2D and 3D inversion software and imaging processes that are later used to process the STB data.

Third, the near surface resistivity distribution thereby achieved is used as an input to the surface to borehole data inversion process and are fixed during this process, such that resistivity changes are not allowed in the near surface geology but permitted in other parts of the model.

The new model is then altered from the original starting model by the surface-to-borehole survey results. The near-surface model parameters are not allowed to vary during the inversion. In this manner, the inversion is restricted to models where the formation resistivity is changing on the reservoir region, thereby providing a more meaningful solution.

In other embodiments of the inventive method, we use surveys made with different physics, for example transient EM surveys which are inductive, or magneto-telluric (MT)

surveys which are plane wave derived solution. These alternate methods also provide a near source resistivity distribution that may be used for EM statics removal. One disadvantage of these alternative method embodiments is that they typically require separate data acquisition equipment.

These processes may be followed by displaying and/or recording the electromagnetic properties of the subsurface area, identifying a hydrocarbon deposit within the subsurface area from the electromagnetic properties, and/or producing hydrocarbons from the identified hydrocarbon deposit by undertaking associated drilling, completion, wellbore remediation, or production activities.

Principles of the STB Method

With surface-to-borehole EM, a series of sources are typically deployed on the surface in concert with an array of receivers deployed in a well. The transmitter broadcasts an EM signal, usually a sinusoid or a square wave, through the earth to be detected by the receivers. The objective is to use the galvanic and EM coupling from the complete array of measurements to do formation resistivity imaging from the well outwards into the reservoir.

An example surface-to-borehole EM field array is shown schematically in FIG. 1. Transmitters 10 can either be a grounded wire type or a magnetically coupled loop. Grounded wires are desirable for deeper applications, in lower resistivity formations, and in applications where steel casing is involved. Surface loops are preferred where the contact resistance is high (i.e. dune sand, frozen ground or volcanic cover) or in relatively shallow applications. The transmitters 10 will typically be connected by power and telemetry cables 12 to a controller 14.

Receivers 20 are almost always magnetic field detectors due to the preponderance of steel well casing in oil field boreholes. Although these receivers 12 may be axial or three-component, axially directed magnetic receiver strings are much more common due to their higher sensitivity. Electric dipole receivers may be used in sections in open hole sections. They are especially useful in horizontal wells and may also be deployed as permanent sensors.

A survey is made by placing receivers 20 in an array covering the depths of interest for each transmitter, often by lowering an array of receivers on a wireline cable 22 from a wireline truck 24 that has computers and data storage devices to record the measurements made by the receivers. The receivers may alternatively be placed within the borehole as part of permanent or semi-permanent wellbore completion hardware, on a power and telemetry cable, on slickline, on coiled tubing, or on drill pipe. The depth range varies for each problem, but a data profile is typically several hundred meters long with stations spaced every few meters above, within, and below the depth range of interest. In many situations, the depth range of interest will be a geologic interval that is suspected of containing a bypassed hydrocarbon deposit 30, i.e. a crude oil and/or natural gas charged reservoir interval that has either not been drained or has been incompletely drained by previous hydrocarbon production activities in the area.

Transmitters 10 are usually aligned in a profile emanating from the well in a particular direction, often perpendicular to geologic strike. While FIG. 1 shows four linear arrays of transmitters 20 deployed in quadrants about a vertical wellbore, it will be understood by those skilled in the art that these transmitters may be deployed in other geometries and the wellbore may alternatively be deviated or have one or more horizontal sections. The surface arrays may also be deployed in an areal mode where one or more transmitters are deployed in accordance with a surface grid pattern, a set of crossed profiles or along a spiral emanating outward from the well. These embodiments are typically preferred where a surface strike/dip direction is not easily discerned. They are also often the most practical deployment geometries when the transmitter(s) are deployed offshore.

Our modeling and sensitivity studies suggest that a full profile, i.e. positioning receivers from the surface (depth=0) to the depth of the reservoir, is not required for effective reservoir imaging. The sensitivity is greatest near the source and receiver positions but relatively weak in the intervening section. This means that a good background model will normally account for the response of the intervening formation.

At each transmitter site, the system broadcasts a waveform and the receivers 20 measure this signal synchronously using a GPS clock to maintain the phase reference. These data are averaged at each depth until a stable reading is achieved and a mean and standard deviation can be determined. The receiver(s) 20 is then repositioned and the data collection begins anew until all desired depth intervals are covered. After the receiver 20 has occupied all vertical positions then the transmitter 10 is repositioned and the data acquisition continues until all required combinations of source positions and receiver positions have been occupied.

Field data are typically interpreted by fitting all of the measurements simultaneously to a model using a numerical 2D (or 3D) inversion. Our typical procedure is to apply a workflow where a model is assembled (often from surface seismic surveys and/or well logs acquired while drilling or from wireline logging), used in sensitivity studies, and then used as a starting model for subsequent data inversions.

Sensitivity

Sensitivity studies of the surface-to-borehole array show high sensitivity near both source and receiver positions. Whereas a high sensitivity is desired in the borehole deployed receiver array it is not useful in the surface deployed transmitter. Our challenge is to focus the measurement on the target of interest, the near borehole geologic formation while satisfying the sensitivity demands for the transmitter. That is we need to provide a near surface resistivity distribution or similar type of electromagnetic property model that adequately addresses the transmitter sensitivity without distorting or changing the image near the receiver.

To analyze the spatial sensitivity we employ the Frechet derivative as described in Spies, B. R. and Habashy, T. M., 1992, "Sensitivity analysis for cross-well electromagnetics", 62nd Ann. International. Mtg., Soc. Expl. Geophys., New Orleans, Expanded Abstracts, pp. 502-505 and Alumbaugh, D. L. and Morrison, H. F., 1995, "Theoretical and practical considerations for crosswell electromagnetic tomography assuming a cylindrical geometry", Geophysics, Vol. 60, No. 3 (May-June 1995), pp. 846-870. The Frechet derivative is defined as the change in the data measured with a given transmitter-receiver pair, caused by a small change in the conductivity at a given point in space. That is, the Frechet Derivative tells us how sensitive the measurement is to the geology at different locations in the media. Mathematically it is defined as $$J_{kl} = \partial d_i^j / \partial m_{xyz}.$$

where d is the datum collected with the i'th transmitter j'th receiver, and m refers to the conductivity at position xyz in the region surrounding the wells.

Figure 2:
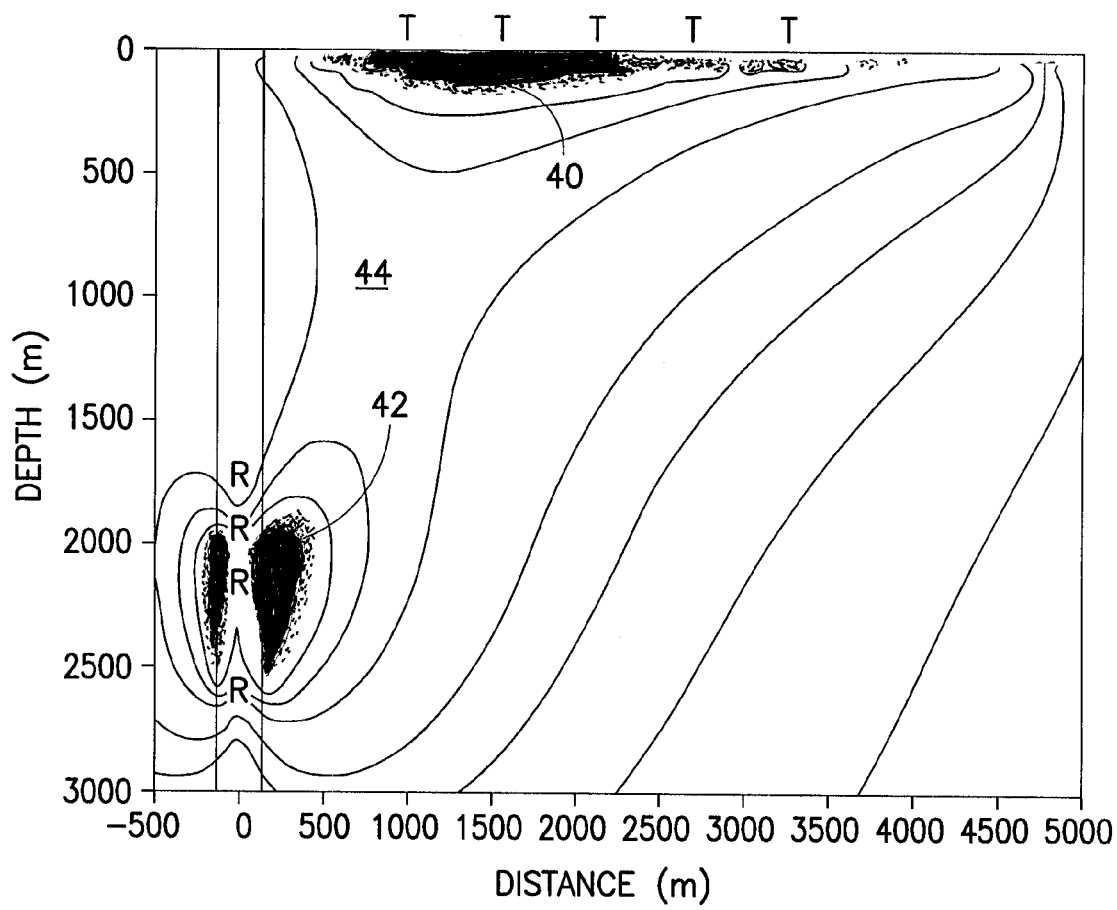
FIG. 2 displays an example surface-to-borehole data sensitivity function.

In FIG. 2, we show an example sensitivity diagram for a surface to borehole configuration over a model of an oilfield. The T's at the top of the figure represent surface based transmitter locations and the R's near the lower left corner of the figure represent borehole receiver locations. This figure shows a first high sensitivity region 40 near the source locations, a second high sensitivity region 42 near the receiver locations, and a relatively insensitive region 44 in the area between them. As can be seen in FIG. 2, the second high sensitivity region 42 can extend for several hundreds of meters away from the borehole predominantly in the direction of the transmitter locations.

We note that when interpreting these data, the inversion code typically uses the Frechet function to adjust the model to fit the observed data. For this array, the inversion will therefore mainly change the conductivity near the source and receiver tools to achieve a better data fit, because these areas comprise the highest sensitivity.

Although we often have many measurement points in the wellbore, we typically have very few transmitter source points and are therefore often fundamentally under-sampled near the transmitters. That is, surface to borehole data acquisition systems typically use only a few transmitters but they are still quite sensitive to the resistivity distribution near the sources. In the preferred embodiment of the inventive method, we collect enough data near the sources to characterize the resistivity near the surface, otherwise the inversion will use the surface to borehole data to do this, and thereby introduce inversion artifacts.

One means to accomplish this is to apply an array of surface-based receivers in concert with the surface-to-borehole transmitters to separately resolve the near surface resistivity structure in the vicinity of each source. We then apply this distribution to our model used in the surface-to-borehole data set and thereby remove the sensitivity to the near surface environment.

In one embodiment, the inventive method removes the static effect from surface-to-borehole EM data by collecting a separate set of surface-based data, typically using the same transmitter(s) applied for the downhole measurements, to build a near surface electromagnetic property model.

Figure 3A:
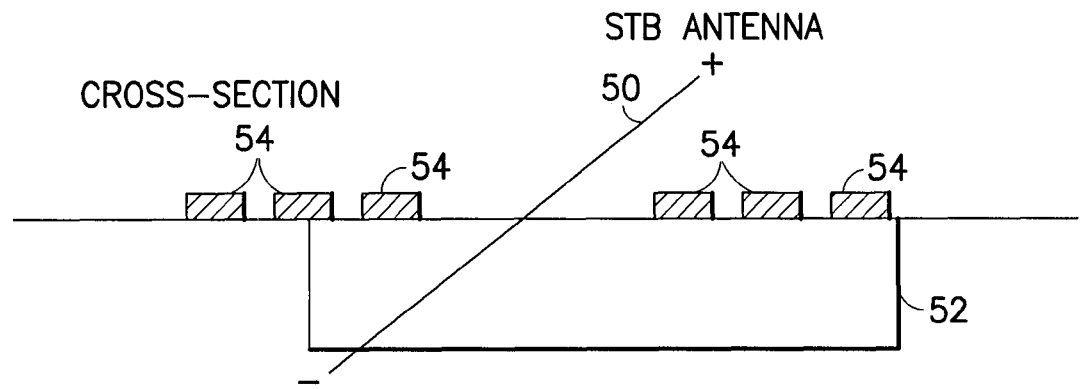
FIG. 3 illustrates cross section and map views of surface based receivers deployed near a surface based transmitter and a discontinuous near-surface geological body.
Figure 3B:
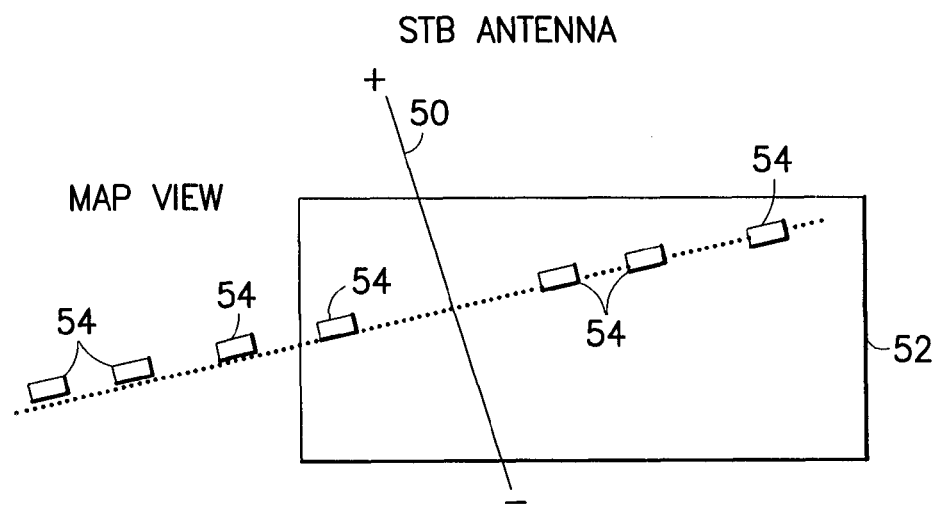

In FIGS. 3A and 3B, we show cross-sectional and map view perspectives of a surface based transmitter deployed near a hypothetical discontinuous geological body. Wire 50 represents the surface base transmitter, body 52 is an area of discontinuous geology and smaller rectangles 54 represent surface based "second" receivers that measure the field from our transmitter. These second receivers are typically connected by a power and telemetry cable to associated control and data recording equipment, which may be located within wireline truck 24 or elsewhere.

Figure 4A:
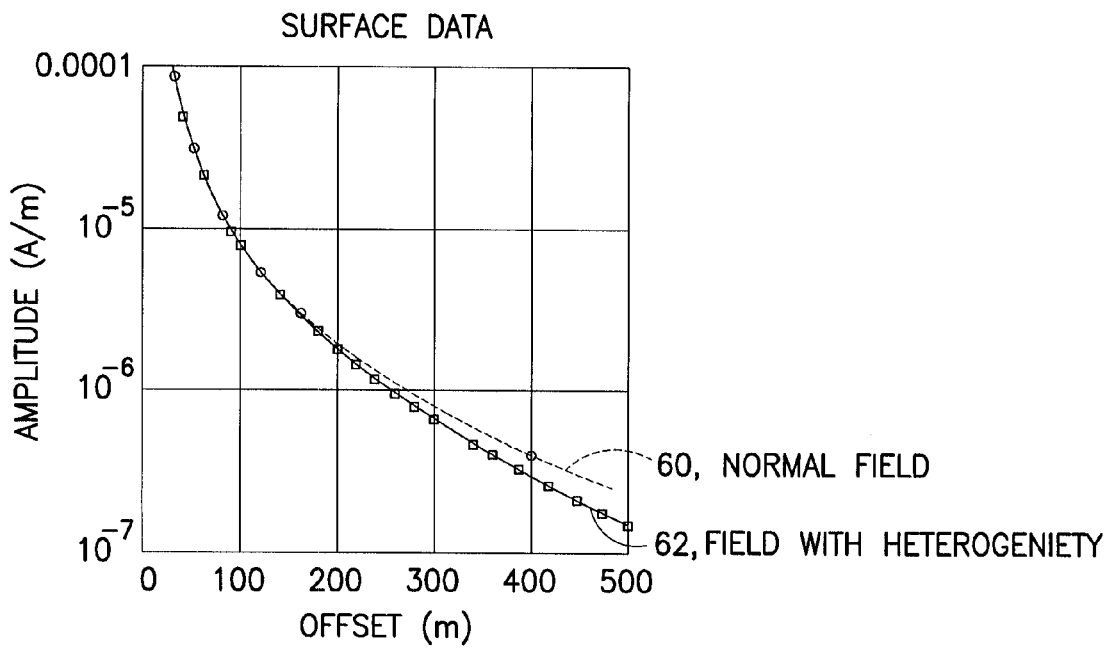
FIG. 4 shows surface-to-borehole field profiles with and without the near-surface geological body being present.

In FIG. 4A, we show synthetic field profiles of surface measurements near the transmitter with the geologic body 52 present and absent. Here the surface data has been generated assuming that the measurement is made at the same frequency as the surface-to-borehole data and with similar magnetic field receivers. The surface-based profile without the body 60 and the surface-based profile with the body 62 are initially similar but they diverge as the receivers are offset farther from the source. The difference between the profiles is used as a diagnostic of the presence of the surface body.

Figure 4B:
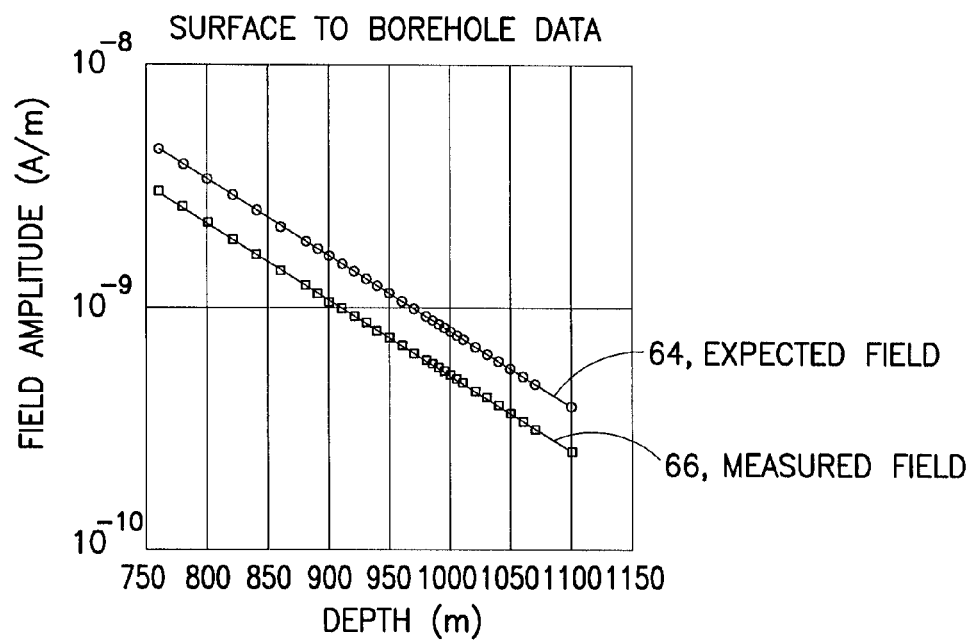

In FIG. 4B, we show synthetic surface to borehole field profiles with and without the surface body present. The plot clearly shows a static effect, where the measured field with the geological body 66 is smaller than that of the measured field without the geological body.

An example work flow that may be used in connection with this surface data may be outlined as follows:

Deploy an array of surface-based receivers in a profile perpendicular to the grounded wire antenna. The profile length should be at least as long as the antenna is wide and it should be deployed along both perpendicular directions. The data collected should be with a similar sensor type use for the surface to borehole data and the data collected at a similar frequency; both amplitude and phase data should be collected.

The surface based data should be fit to a 2D resistivity model using an initial surface to borehole model that is typically created using whatever geophysical data associated with the subsurface area is available at the time. If the initial STB electromagnetic property model does not extend to the surface then the surface data is inverted using a halfspace (i.e. homogeneous) starting model as described in Routh, P. S. and Oldenburg, D. W., "Inversion of controlled source audio-frequency magnetotellurics data for a horizontally layered earth", Geophysics, Vol. 64, No. 6 (November-December 1999), pp. 1689-1697.

The recovered model is then used as a first estimate when processing the STB data. In this case the surface formation is fixed while the near well formation at the reservoir depths can vary.

As discussed above, there are alternative methods for achieving the same aim by acquiring electromagnetic data using a separate system. There are several commercial options available to do this that include:

Time Domain EM systems, which may either be an airborne or land based system of the type that are often used for oil exploration, mineral exploration, or hydrology related surveying purposes;

Dipole-dipole resistivity arrays, for example the type described in Nyquist, J. E., Peake, J. S., and Roth M. J. S., "Comparison of an optimized resistivity array with dipole-dipole soundings in karst terrain", Geophysics, Vol. 72, No. 4, pp. F139-F144, July-August 2007; and Audio frequency magneto-tellurics, for example the type described in Routh, P. S. and Oldenburg, D. W., "Inversion of controlled source audio-frequency magnetotellurics data for a horizontally layered earth", Geophysics, Vol. 64, No. 6 (November-December 1999), pp. 1689-1697.

These data are used in virtually the same fashion as above using a virtually identical workflow. The inventive method may conclude with one or more of the following: 1) displaying and/or recording the electromagnetic properties of the subsurface area, 2) identifying a hydrocarbon deposit within the subsurface area using the electromagnetic properties of the subsurface area (typically by identifying areas that have relatively high resistivities or similar electromagnetic properties), and 3) producing hydrocarbons from the hydrocarbon deposit by undertaking associated drilling, completion, wellbore remediation, or production activities (such as infill drilling, re-perforating, fracturing, stimulating, etc.).

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope of the appended claims. All documents referenced herein are hereby incorporated by reference.

What is claimed is:

1. A method of determining an electromagnetic property of a subsurface area, comprising:
   a) developing an electromagnetic property model of near surface area, and b) acquiring electromagnetic data from one or more electromagnetic transmitters located above said near-surface area and one or more electromagnetic receivers located within a wellbore; and c) processing said electromagnetic data using as an input said electromagnetic property model of near surface area to determine one or more electromagnetic properties of said subsurface area, wherein parameters of the electromagnetic property model of near surface area are not allowed to vary during said processing.

2. A method of determining an electromagnetic property of a subsurface area in accordance with claim 1, wherein said electromagnetic transmitters comprise one or more grounded wire type or magnetically coupled loop type electromagnetic transmitters.

3. A method of determining an electromagnetic property of a subsurface area in accordance with claim 1, wherein said electromagnetic receivers comprise one or more axially directed type, three-component type, or electric dipole type electromagnetic receivers.

4. A method of determining an electromagnetic property of a subsurface area in accordance with claim 1, wherein said electromagnetic receivers measure signals synchronously using a GPS clock to maintain a phase reference.

5. A method of determining an electromagnetic property of a subsurface area in accordance with claim 1, wherein said subsurface area includes a region that is within an offset of between 20 and 1500 meters from said receiver locations.

6. A method of determining an electromagnetic property of a subsurface area in accordance with claim 1, wherein said electromagnetic property model is developed using data acquired by electromagnetic receivers located above said near-surface area.

7. A method of determining an electromagnetic property of a subsurface area in accordance with claim 6, wherein said one or more electromagnetic transmitters comprise grounded wire antennas and wherein said electromagnetic receivers are deployed in one or more arrays in profiles that are perpendicular to one or more of said grounded wire antennas.

8. A method of determining an electromagnetic property of a subsurface area in accordance with claim 7, wherein said one or more arrays have profile lengths that are at least as long as said grounded wire antennas are wide and are deployed along both perpendicular directions with respect to said grounded wire antennas.

9. A method of determining an electromagnetic property of a subsurface area in accordance with claim 6, wherein said electromagnetic receivers positioned above said near-surface area are of similar sensor type as said electromagnetic receivers located within said wellbore.

10. A method of determining an electromagnetic property of a subsurface area in accordance with claim 9, wherein said electromagnetic receivers positioned above said near-surface area and said electromagnetic receivers located within said wellbore are used to acquire amplitude and phase data at a similar frequency.

11. A method of determining an electromagnetic property of a subsurface area in accordance with claim 6, wherein data obtained by said electromagnetic receivers positioned above said near-surface area is used to update a near surface portion of an initial surface to borehole electromagnetic property model.

12. A method of determining an electromagnetic property of a subsurface area in accordance with claim 11, wherein said initial surface to borehole electromagnetic property model does not extend to the surface and said data obtained by said electromagnetic receivers positioned above said near-surface area is inverted using a halfspace starting model.

13. A method of determining an electromagnetic property of a subsurface area in accordance with claim 1, wherein said electromagnetic property model is developed using one or more of time domain EM systems, dipole-dipole resistivity arrays, and audio frequency magneto-tellurics.

14. A method of producing hydrocarbons from a hydrocarbons deposit within a subsurface area, comprising:
    identifying said hydrocarbon deposit using one or more electromagnetic properties of a subsurface area determined by a process that included:
    i) developing an electromagnetic property model of a near surface area, and
    ii) acquiring electromagnetic data from one or more electromagnetic transmitters located above said near-surface area and one or more electromagnetic receivers located within a wellbore
    iii) processing said electromagnetic data using as an input said electromagnetic property model of near surface area to determine said one or more electromagnetic properties of said subsurface area, wherein parameters of the electromagnetic property model of near surface area are not allowed to vary during said processing and
    undertaking drilling, completion, and/or remediation measures to produce hydrocarbons from said hydrocarbons deposit.

15. A method of determining an electromagnetic property of a subsurface area, comprising:
    a) developing an electromagnetic property model of near surface area using data acquired by electromagnetic receivers located above said near-surface area in order to to update a near surface portion of an initial surface to borehole electromagnetic property model, said initial surface to borehole electromagnetic property model not extending to the surface and said data obtained by said electromagnetic receivers located above said near-surface area being inverted using a halfspace starting model,
    b) acquiring electromagnetic data from one or more electromagnetic transmitters located above said near-surface area and one or more electromagnetic receivers located within a wellbore; and
    c) processing said electromagnetic data using said electromagnetic property model of near surface area to determine one or more electromagnetic properties of said subsurface area.

* * * * *